US008026805B1

(12) United States Patent  (10) Patent No.: US 8,026,805 B1
Rowe  (45) Date of Patent: Sep. 27, 2011

(54) MEDIA TRACKER

(75) Inventor: Edward R. W. Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 363 days.

(21) Appl. No.: 12/421,542

(22) Filed: Apr. 9, 2009

(51) Int. Cl.
*G08B 1/08* (2006.01)
(52) U.S. Cl. ........... 340/539.1; 340/539.13; 340/539.26; 340/10.1; 340/10.4; 340/573.1; 340/573.4; 340/5.74; 340/5.86; 709/218; 709/219; 709/231; 709/248
(58) Field of Classification Search ............... 340/539.1, 340/539.13, 539.26, 573.1, 573.4, 10.1, 10.4, 340/5.74, 5.86; 709/218, 219, 231, 248
See application file for complete search history.

(56) References Cited

U.S. PATENT DOCUMENTS

| | | | |
|---|---|---|---|
| 7,659,820 B2 * | 2/2010 | Schnee et al. | 340/572.1 |
| 2005/0198029 A1 | 9/2005 | Pohja et al. | |
| 2007/0076309 A1 * | 4/2007 | Shimizu et al. | 359/811 |
| 2007/0095905 A1 * | 5/2007 | Kadaba | 235/384 |
| 2007/0157304 A1 | 7/2007 | Logan et al. | |
| 2007/0234048 A1 | 10/2007 | Ziv | |
| 2008/0091722 A1 | 4/2008 | Wendelrup | |
| 2008/0183645 A1 | 7/2008 | Burger et al. | |
| 2008/0200154 A1 | 8/2008 | Maharajh et al. | |
| 2009/0268655 A1 | 10/2009 | Bertz et al. | |

OTHER PUBLICATIONS

"iPod Your BMW," Apple Press Release [online], Jun. 21, 2004. Retrieved from the Internet: <URL: http://www.apple.com/pr/library/2004/jun/21bmw.html>, [retrieved on Apr. 9, 2009], 1 page.
"RadioBookmark.com: Home page," [online]. Retrieved from the Internet: <URL: http://www.radiobookmark.com/>, [retrieved on Apr. 9, 2009], 2 pages.
"RadioBookmark.com: Learn More," [online]. Retrieved from the Internet: <URL: http://www.radiobookmark.com/static/learn_more>, [retrieved on Apr. 9, 2009], 7 pages.
"Slingbox Solo—Features," [online]. Retrieved from the Internet: <URL: http://www.slingmedia.com/go/slingbox-solo-slingplayer>, [retrieved on Apr. 9, 2009], 1 page.
Ricker, Thomas, "Apple's Remote: turns your iPhone into a WiFi remote control," Engadget [online], Jul. 10, 2008. Retrieved from the Internet: <URL: http://www.engadget.com/2008/07/10/apples-remote-control-application-for-itunes-and-apple-tv/>, [retrieved on Apr. 9, 2009], 6 pages.

(Continued)

*Primary Examiner* — Tai T Nguyen
(74) *Attorney, Agent, or Firm* — Fish & Richardson P.C.

(57) ABSTRACT

Methods, systems, and apparatus, including computer program products, for tracking media history using a mobile device. In some implementations, a method includes receiving a notification indicating that a mobile device is in communication range of a first player device. First media context information specifying media content being played by the first device and capabilities for the first device is received. The capabilities indicate types of media content that can be played by the first device. The first media context information is associated with the first player device. A second notification indicating that the mobile device is in communication range of a second player device is received. Second media context information is received. The second context information is associated with the second device. A history of media content is generated from the first media context information and the second media context information.

25 Claims, 9 Drawing Sheets

OTHER PUBLICATIONS

McCarthy, Caroline, "Deutschlanders: E-mail Google Maps to your BMW," CNET News [online], Mar. 8, 2007. Retrieved from the Internet: <http://news.cnet.com/8301-17939_109-9695148-2.html>, [retrieved on Apr. 9, 2009], 2 pages.

"Beo5 Guide," Bang & Olufsen product guide [online]. Retrieved from the Internet: <http://www.bang-olufsen.com/UserFiles/File/ug/Beo5/Beo5_English.pdf>, [retrieved on Apr. 9, 2009], 24 pages.

"Contextual advertising," from Wikipedia [online], Apr. 1, 2009. Retrieved from the Internet: <URL: http://en.wikipedia.org/wiki/Contextual_advertising>, [retrieved on Apr. 9, 2009], 3 pages.

"Behavioral Targeting," from Wikipedia [online], Mar. 30, 2009. Retrieved from the Internet: <URL: http://en.wikipedia.org/wiki/Behavioral_targeting>, [retrieved on Apr. 9, 2009], 3 pages.

* cited by examiner

| Recently Viewed Content | | | |
|---|---|---|---|
| Description | Position | Type | Source Info |
| Bob's Photos | 5/25 | Photo | Internet: http://bobsphotos.com |
| All Things Considered | 0:3:31/1:28:00 | Audio | Radio: 90.1 FM |
| The Simpsons | 15:31/29:20 | Video; Audio | HomeDevice#1 |

FIG. 5

MEDIA TRACKER

BACKGROUND

This specification relates to the transfer of media context information between media content players.

A typical individual consumes various media content from various players during any given day. For example, an individual might wake up in the morning and watch the news on a television, get in a car to drive to work and listen to a radio news program on the car radio, get into work and listen to an Internet radio station over a computer, and get home from work and watch recorded television from a digital video recorder (DVR).

SUMMARY

This specification describes technologies relating to tracking media history using a mobile device.

In general, one aspect of the subject matter described in this specification can be embodied in a method that includes the acts of receiving a first notification indicating that a mobile device is in communication range of a first player device. First media context information is received from the first player device that specifies first media content currently being played by the first player device and identifies first capabilities for the first player device. The first capabilities indicate one or more types of media content that can be played by the first player device. In response to receiving the first media context information, the first media context information is associated with the first player device. A second notification indicating that the mobile device is in communication range of a second player device is received. The second player device is distinct from the first player device. Second media context information is received from the second player device that specifies second media content currently being played by the second player device and identifies second capabilities for the second player device. The second capabilities indicate one or more types of media content that can be played by the second player device. In response to receiving the second media context information, the second media context information is associated with the second player device. A history of media content is generated from the first media context information and the second media context information. Other implementations include corresponding systems, apparatus, computer program products, and computer storage media.

These and other implementations can optionally include one or more of the following features. Receiving media context information from the first player device can include selecting a protocol from a plurality of protocols through which the first player device can communicate and receiving media context information according to the selected protocol. The first media context information can comprise a plurality of packets received from the first player device. The first media content can be from a first source and the second media content can be from a distinct second source.

A third notification indicating that the mobile device is in communication range of a third player device can be received. Third capabilities for the third player device can be received. The third capabilities indicate one or more types of media content that can be played by the third player device. A modified history can be generated that only includes media content of a type that can be played by the third player device. The modified history can be presented. Presenting the modified history can include instructing one of the third player device or the mobile device to present the history.

Input selecting media content from the modified history can be received. The third device can be instructed to play the selected media content. The selected media content can have a timeline. The media context information for the selected media content can further include a current location in the timeline. Instructing the third device to play the selected media content can include instructing the third device to play the selected media content beginning at the current location in the timeline.

Recommended media content can be selected based on the history of media content. The selection can be further based on a current geographic location of the mobile device. An advertisement can be selected based on the history of media content, and the advertisement can be presented.

The system can comprise a mobile device operable to perform the receiving a first notification, the receiving first media context information, the associating the first media context information with the first player device, the receiving a second notification, the receiving second media context information, the associating the second media context information with the second player device, and the generating a history of media content.

Particular embodiments of the subject matter described in this specification can be implemented to realize one or more of the following advantages. A history of content played for a user can be maintained. A user can choose to finish playing unfinished content. A user can start playing content on one device and finish playing the content on another device. A user can be charged for media played for the user. The history can be used to generate ratings for media content. User-targeted recommendations can be generated based on content that a user played from multiple devices and from multiple sources. These recommendations can be more directly focused on what the user has experienced. User-targeted advertising can be generated based on content that a user played from multiple devices and from multiple sources. These advertisements can be more directly targeted to appeal to a user based on a user's known experiences and interests.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 5 is an example visual presentation of a history.

Like reference numbers and designations in the various drawings indicate like elements.

DETAILED DESCRIPTION

Figure 1:
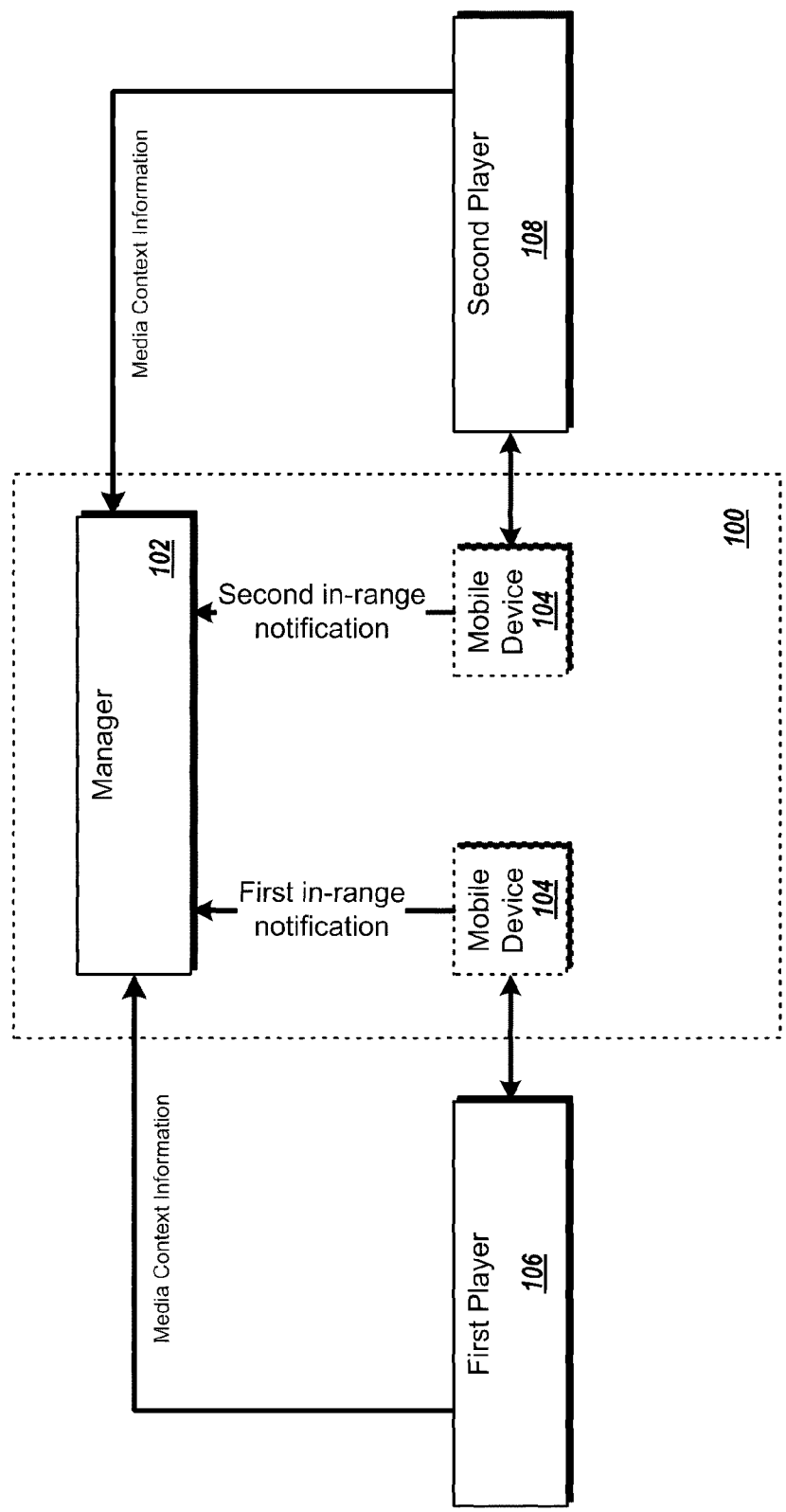
FIG. 1 illustrates example interactions between a first player, a second player, and a system including a manager and a mobile device.

FIG. 1 illustrates example interactions between a first player 106, a second player 108, and a system 100 including a manager 102 and a mobile device 104. Generally speaking, the first player 106, the second player 108, the manager 102, and the mobile device 104 communicate with each other through a wireless or wired computer network or other means of communication. Examples of networks include the Internet, cellular networks, and satellite networks. Examples of wireless communication protocols include Bluetooth™, Wi-Fi™, ZigBee™, Z-Wave™, and infrared protocols.

The first and second players 106 and 108 are able to play media content. Generally speaking, media content is data or information that can be played or experienced by a user according to a timeline. A timeline is a logical progression of content. For example, the timeline of video content could be the sequence of frames in the video. The timeline of a picture slideshow could be the order of the pictures. The timeline of a video game could be the order in which a user progresses through the game (e.g., the order of levels in the game).

Media content can be live or prerecorded. Examples of media content include recordings or live broadcasts of movies, television shows, videos, radio broadcasts, photo slideshows, audio, music recordings, and interactive media such as interactive video games.

Examples of the first and second players include digital video recorders, radios, televisions, computers, portable media players such as portable video players and portable music players, electronic game systems mobile phones, cameras, and electronic billboards, and combinations of these. In some implementations, the players can receive and respond to instructions sent by the manager 102.

The media content can be from any of a variety of sources. Generally speaking, a source is a provider of media content. Examples of sources include radio stations, websites (including personal websites, and content provider websites such as YouTube™ or Hulu™), network servers that stream content, web cameras, television stations, and persistent storage (e.g., hard drives).

Generally speaking, media content has a type that indicates how the media content is played (and optionally, other information about the content). Each type of media content can have one or more aspects. Each aspect describes part of how the content is experience by a user. For example, video type content has visual and audio aspects, while audio type content has just an audio aspect. The type can also identify a source from which media content is received (e.g., an Internet radio station), or can identify how the media content is encoded (e.g., high definition (HD) video, analog video, digital video disk (DVD), high definition DVD (HD DVD™), Blu-ray™, wave (way), Moving Picture Experts Group Layer 3 (mp3), Ogg vorbis, bitmaps, etc). The media content type can also specify additional user options provided by the content, for example, closed captions or audio available in multiple languages. The media content type can also indicate further information on the category of the content, for example, television content, amateur video content, professional movie content, radio broadcast, etc.

Each player is associated with capabilities that identify the types of media content the player can play. In some implementations, a type of media content can be played by a given player if all of the aspects of the type of media content can be played by the given player. For example, if the media content type is video (having audio and visual aspects), the given player would have to be able to play both the visual aspects of the video and the audio aspects of a video for the video type to be included. If the given player is a radio, the radio would be capable of playing audio, but not video files, because while a radio does have speakers, a radio does not have a screen. Thus, the capabilities for a radio could include a type for audio files but not video files. In alternative implementations, a type of media content can be played on the given player if some of its aspects can be played by the given player. For example, if the media content type is a video, the given player would only have to be able to play either the visual aspects or the audio aspects of the video for the video type to be included. In this implementation, the radio would be capable of playing the video type. In some implementations, a type of media content can be played by a given player if the player can receive content from the source specified in the type of media content. For example, if the type specifies a radio source, a device with a radio tuner would have the capability to play that type of content, but a device without a radio tuner would not have the capability to play that type of content. In some implementations, a type of media content can only be played by a given player if the player can play the particular encoding specified in the type of media content. For example, if the type specifies an mp3 encoding, a given device has the capability to play the type only if the device can play content with an mp3 encoding.

The media content can be received from any of a variety of devices. For example, the media content can be stored on a player or can be streamed or copied from another device, e.g., the first and second players 106 and 108, the mobile device 104, or another device such as a network server. Media content is copied to a player, for example, when the media content is stored in its entirety on the player. Media content is streamed to a player, for example, when the media content is transferred as the player is playing the media content (e.g., real-time transfer of content, or buffered transfer of content).

The mobile device 104 is a portable device, e.g., one that is carried by a user, and can be associated with the user. The mobile device is configured to allow the mobile device to communicate with one or more players or a manager, as described above. In some implementations, the mobile device can also perform actions including sending and receiving phone calls, sending and receiving digital data, storing content, and presenting content, e.g., playing media content. Examples of mobile devices include mobile phones, pagers, personal digital assistants, and Universal Serial Bus (USB) flash drives, such as jump drives. Mobile devices can also be wearable devices, such as a buttons, necklaces, rings, or watches, for example, that are configured to communicate with one or more players or a manager.

The mobile device 104 can be moved between players so that the mobile device is in communication range of the first player 106 or the second player 108. The double headed arrows in FIG. 1 indicate that a mobile device is in communication range of a given player.

Figure 2:
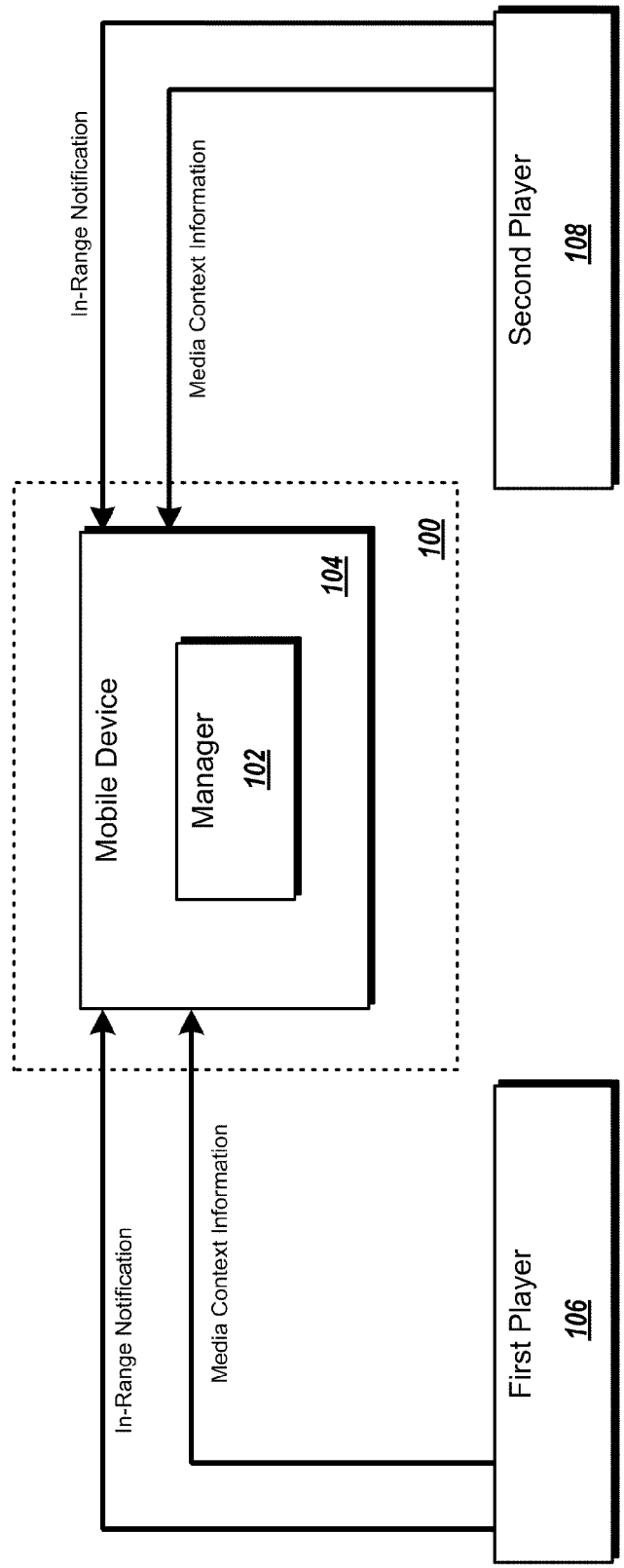
FIG. 2 illustrates example interactions between a first player, a second player, and a system including a mobile device that includes a manager.

The manager 102 can be part of one or more of the mobile device, the first player, and the second player, or can be a separate entity. For example, FIG. 2 illustrates example interactions between a first player 106, a second player 108, and a system 100 made up of a mobile device 104 that includes a manager 102.

Returning to FIG. 1, the manager 102 tracks which players are in a vicinity of the mobile device 104 based on notifications the manager receives when the mobile device 104 is in communication range of a player. The manager 102 can receive the notification from the mobile device 104, a player, or another device, such as a cell phone network server. The manager 102 can also generate the notification based on other information the manager receives.

Two devices are in communication range when they are within a certain distance of each other. In some implementations, the distance is defined to be the maximum distance over which the two devices can communicate. For example, if the mobile device and a player communicate using a Bluetooth™ protocol, then the distance could be the maximum distance over which the two devices could communicate using a Bluetooth™ protocol. In some implementations, the distance is separately defined for each player, based on how a user typically interacts with a player. For example, the distance could be defined as the maximum distance a user could be from the player and still experience the media played by the player. For a car radio, the distance could be defined to include only the car's interior. For a television, the distance could be defined to be the furthest distance that a typical user could sit from the television and still see the content.

The distance could also be defined as a typical distance a user is from the player while content from the device is being consumed. For example, for a television of a certain size, the distance could be the recommended distance that a viewer sit from a television of that size. For a portable DVD player, the distance could be a typical user's arm length, so as to allow the user to still reach and control the player. In some implementations, the distance is defined to be the same for all players, for example, by choosing the maximum, minimum, or average distance for a set of potential devices. In some implementations, the distance is based on a geographical location. For example, if the mobile device is in the same room as the player, or alternatively, the same building as the player, the two can be considered to be in communication range. In some implementations, the distance is user-defined. For example, a user can provide feedback indicating that the mobile device is in communication range of the player, or a user can specify the distance for a given player and mobile device (for example, the first time the two devices are near each other).

In some implementations a given player must be turned on for the mobile device to be in communication range of the player.

The mobile device 104 and/or a given player can determine that they are in communication range, for example, by exchanging information according to a Bluetooth™ protocol. If the two devices are close enough to communicate, they can be deemed to be in communication range of each other. In some implementations, a player broadcasts a notification indicating that it is accessible. The mobile device 104 can receive this notification and determine that it is in communication range of the player. In some implementations, the mobile device 104 broadcasts a notification indicating that it is accessible. A player device can receive this notification and determine that it is in communication range of the mobile device 104.

The manager 102 or another device can determine that the mobile device 104 is in communication range of a given player based on notifications indicating the location of the two devices from either the individual devices or another device, such as a cell phone network server. For example, the manager 102 (or the other device) can receive global positioning system (GPS) data or triangulation data (e.g., from cell phone towers or wi-fi transmitters in the vicinity of the mobile device and the given device). The manager 102 (or the other device) can then compare the locations of the mobile device and the given player to determine if the two are in communication range.

The manager 102 also receives media context information from one or more players. Media context information provides information about media content currently being played on the player. The media context information identifies the media content currently being played. The media context information can also identify a source for the media content. The media context information can also identify additional information about the media content currently being played, such as the type of content (e.g., video, audio, television, photographs, documents, DVD, etc.), the genre of the content (e.g., country music, television comedy, drama, etc.), or the current location in the content being played. The media context information can also include capabilities for the player device playing the content (e.g., identifying one or more types of media content that can be played by the player device), or details about the state of the player device playing the content (e.g., the current audio volume of the device, the current screen brightness of the current device, whether visual content is being viewed full-screen, etc.).

The identifier of the media content currently being played can be a globally unique identifier or a local identifier unique to the user associated with the mobile device. A globally unique identifier can be, for example, an universal resource locator address (URL) for content being streamed over the Internet, an identifier stored within the media, or an identifier generated from the media, for example, by generating a hash value from the media data. A local identifier can be a local identifier unique to the user associated with the mobile device, for example, a path to a file stored on the manager. The current location is data indicating how much of the content has been played by the player, e.g., data indicating where the player is in the timeline associated with the media content. The current location may also indicate the current state of the content being played, for example, the current state of a video game. The current location can be a direct location, for example, for content such as videos and music, the current location could be an elapsed time into the video or music, and for content such as a picture slideshow, the current location could be the current picture being viewed. The current location can also be an indirect measure of location. For example, the current location could be a piece of the content played by the player or an identifier created by generating a hash value from the last part of the content. In some implementations, common elements such as white noise for audio files and black screens for video files are not included in the indirect measure of location.

In some implementations, the manager 102 receives data identifying one or more protocols through which the player can communicate before receiving the media context information. The manager can select a protocol and use the protocol to receive media context information from the player. The protocol can be selected, for example, by selecting a protocol through which the player and the manager device can communicate. In some implementations, the manager sends data to the player indicating the selected protocol before the media context information is received.

The manager 102 associates received media context information with the mobile device. In some implementations, associating the first media context information with the mobile device includes determining an identifier for the mobile device. The identifier can be received from the mobile device or generated by or for the manager. For example, the identifier can be based on the Media Access Control address (MAC address) or physical address of the mobile device, or other identifying information about the mobile device. For example, if the mobile device is a phone, a unique identifier can be generated based on the telephone number associated with the phone. If the mobile device has a SIM card, the identifier can be generated based on information stored on the SIM card, for example, based on the International Mobile Subscriber Identity (IMSI) or Integrated Circuit Card Identifier (ICCID) of the SIM card.

In some implementations, the manager 102, mobile device 104, first player 106, and second player 108 generally interact as follows. The mobile device 104 and the first player 106 can come in communication range of each other. The manager 102 can receive a first notification indicating that the mobile device 104 is in communication range of the first player 106. The manager 102 can then receive media context information from the first player 106. The manager 102 can then associate the media context information with the mobile device 104.

In some scenarios, the first player 106 and the mobile device 104 may subsequently fall out of range. This can occur when the user carries the mobile device away from the first player, such as when a user walks away from a television he was watching while carrying a cell phone.

The mobile device 104 may then come in communication range of a second player 108. The manager 102 receives a second notification. The second notification indicates that the mobile device 104 is now in communication range of a second player 108. The manager 102 can then receive media context information from the second player 108, and associate the media context information with the mobile device 104.

The manager 102 can then generate a history of recently played content from the media context information received from the first and second players 106 and 108.

Figure 3:
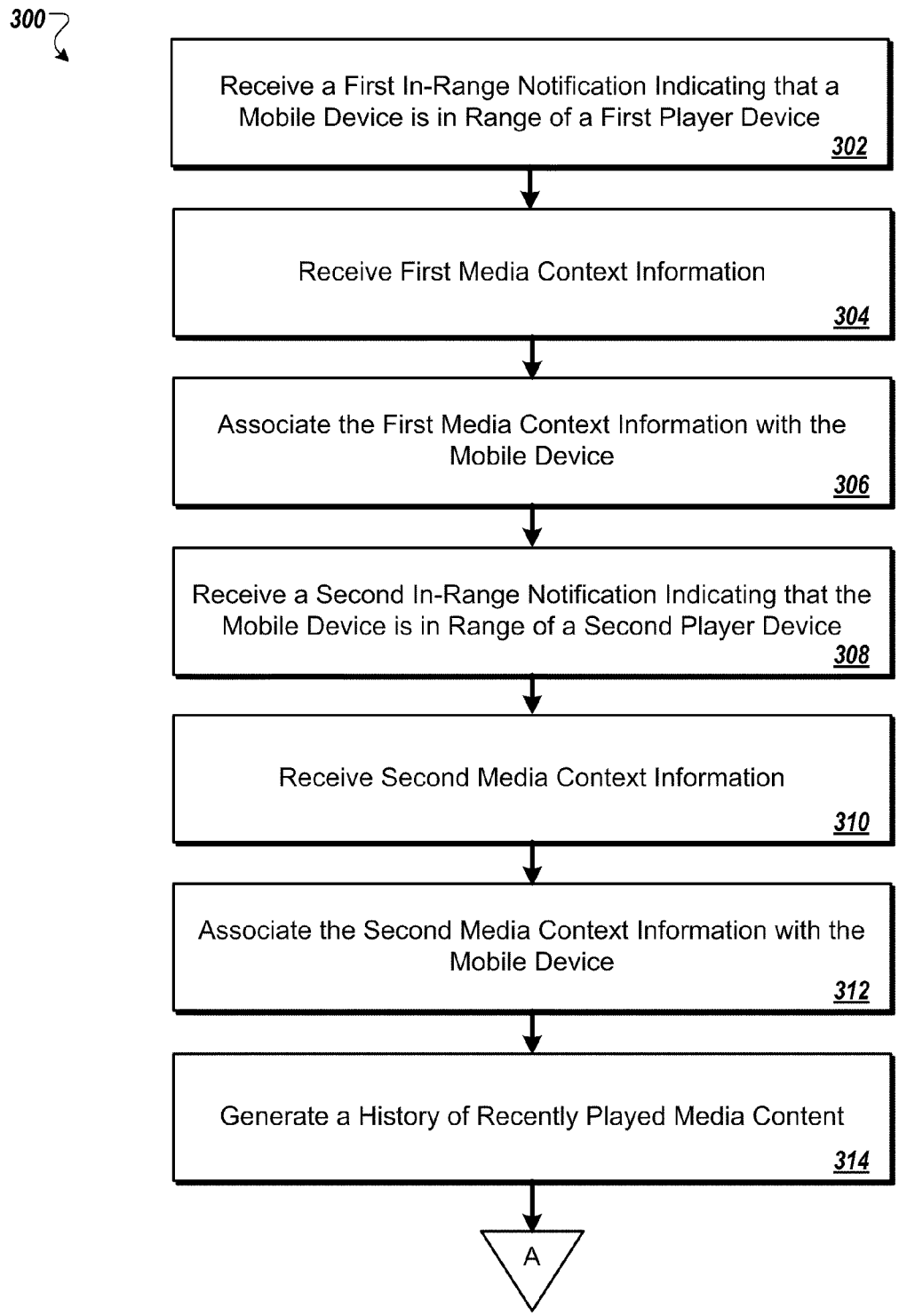
FIG. 3 illustrates an example method for generating a history of recently played media content.

FIG. 3 illustrates an example method for generating a history of recently played media content. The method can be performed by a manager, such as a manager device.

A first notification indicating that a mobile device is in communication range of a first player is received (step 302). The first notification can be received as described above in reference to FIG. 1.

First media context information is received (step 304). The media context information identifies first media content currently being played by the first player device as well as capabilities for the first player, for example, as described above in reference to FIG. 1. The media context information can also include additional information about the media content being played, such as the source, the type, or a current location in the timeline for the media, for example, as described above in reference to FIG. 1.

The first media context information is associated with the mobile device (step 306), for example, as described above in reference to FIG. 1.

A second notification indicating that the mobile device is in communication range of a second player is received (step 308), for example, as described above in reference to FIG. 1.

Second media context information is received (step 310). The second media context information identifies second media content currently being played by the second player, capabilities of the second player, and may include other information, for example, as described above in reference to FIG. 1.

In some implementations, the second media content is from a second source that is distinct from the source of the first content. Two sources can be distinct when they are different types of sources, for example, a television channel and a radio station, or when they are two different sources of the same type, for example, two different television channels.

The second media context information is associated with the mobile device (step 312), for example, as described above in reference to FIG. 1.

A history of recently played media content is generated (step 314). The history of recently played media content is generated from the first media context information and the second media context information. The history of recently played media content can include an identification of all media content identified by the first and second media context information, or can include an identification of some, but not all, of the media content identified by the first and second media context information. The history may also include additional information about each media content such as its type, its source, or a current location in the media content. This information can be retrieved from the context information or from another source, such as a database that associates additional information with media content identifiers. In some implementations, the history includes capabilities for one or both of the first and second players. In some implementations, the history of recently played media content only includes media content that was played within a certain threshold, for example, within the last week or the last month. The threshold can be determined, for example, based on user preference. In some implementations, the history only includes media content of a given kind. The kind of media content can be a type, a genre, or a source; for example, audio content, comedies, or television content. In some implementations, the history groups the information about media content based on additional information associated with the media content, such as type, genre, or source. For example, information could be grouped based on genre such that information about comedy content is together, information about drama content is together, and information about action content is together. The history may optionally be stored, for example, in a database on the manager device or on another device.

In some implementations, media context information is received periodically, while the mobile device is still in communication range of a player. The period can be regular, for example, every 30 seconds, every minute, every five minutes, etc, or can be irregular. The period can be determined by the type of media content being played on the player. Various types of content typically have different lengths. For example, a music song is generally three or four minutes long, while a television program can be thirty minutes to an hour long. Context information can be sent more frequently for media content with a shorter length, to ensure that the information about what is being played, as well as the current location in what is being played, is accurate. The period could also be based on natural breaks in the media content being presented. For example, if the media content is a recorded movie such as a DVD, a natural place to break could be chapters on the DVD, and thus the media context information could be sent at every chapter. If the media content is a television program, a natural place to break could be at commercial breaks, and thus the media context information could be sent at the beginning or the end of each commercial break. If the media content is a video, a natural place to break could be every time a scene in the video changed, and thus the media context information could be sent at every scene change. The period can also be determined based on the movement of the mobile device (e.g., the rate or direction of movement of the mobile device). For example, the period could be shorter when the mobile device is moving rapidly away from the player. The rate and direction can be determined, for example, using accelerometer data from an accelerometer on the mobile device, using GPS data tracking the location of the mobile device over time, or using triangulation data (e.g., from cell phone towers or wi-fi transmitters) tracking the location of the mobile device over time.

In some implementations, the mobile device is assumed to be in communication range of the first player until an out-of-range notification is received. An out-of-range notification indicates that the two devices are no longer in communication range. The out-of-range notification can be received much as a notification that the two devices are in communication range can be received, after the conditions that led the notification that the two devices are in communication range to be received are no longer true. For example, if two devices are considered to be in communication range while they are within a certain distance, the out of range notification could be sent once the two devices are no longer within that distance (for example, when a Bluetooth™ connection between the mobile device and the first player is lost, or when the location of the two devices is too far apart).

In some implementations, media context information is received from a player when the player and the mobile device are almost out of range. For example, if the distance between the two devices (as measured based on their location) approaches the maximum distance for two devices to be considered in communication range, e.g., when the distance approaches a given threshold, then the two devices can be deemed almost out of range. The location of the two devices can be determined, for example, using GPS. As another example, if the mobile device and the first player are connected, when the connection begins to weaken (for example, when the Bluetooth™ signal fades), the two devices could be deemed almost out of range. As yet another example, the two devices can be deemed to be almost out of range based on the movement of the mobile device. For example, if the mobile device moves rapidly (for example, when a person carrying the mobile device stands up), the two devices could be deemed to be almost out of range based on the movement of the mobile device. If the mobile device is moving away from the player and the signal strength is weak, the two devices could be determined to be almost out of range. The movement of the mobile device can be determined, for example, using accelerometer data, GPS data, or triangulation data.

In some implementations, receiving media context information includes selecting a protocol through which the first player device can communicate with the manager and receiving the media content according to the selected protocol, for example, as described above in reference to FIG. 1. In some implementations, the media context information is a plurality of packets (e.g., formatted blocks of data exchanged according to the selected protocol).

Once the history of recently played media content is generated, the history can be used to provide various enhanced features to a user.

In some implementations, the history is used to allow the user to later resume playback of media content on a device such as a player or the mobile device.

Figure 4:
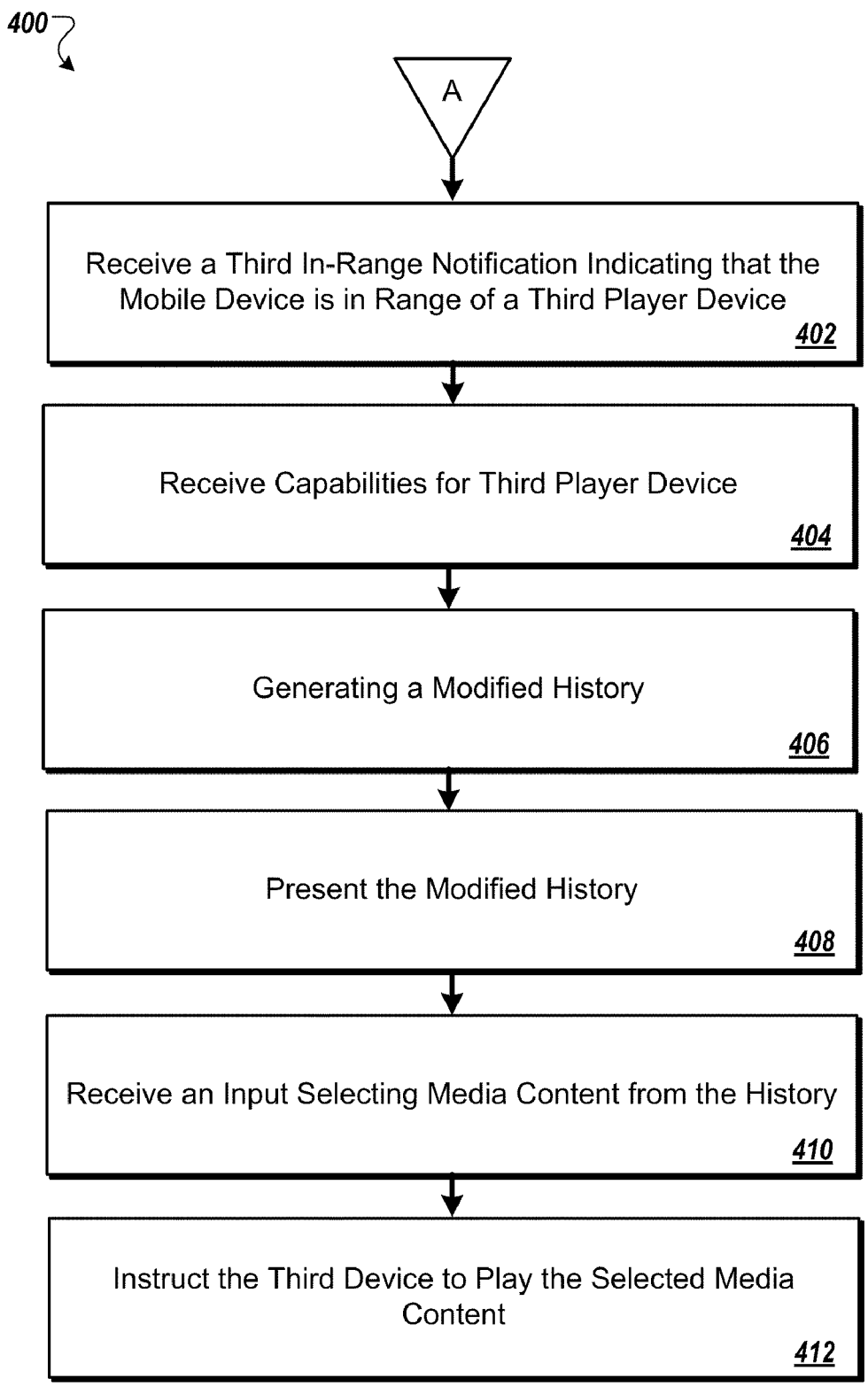
FIG. 4 illustrates an example method for allowing a user to later resume playback of media content on a player device.

FIG. 4 illustrates an example method for allowing a user to later resume playback of media content on a player device. The method can be performed by a manager, such as a manager device.

A third notification indicating that the mobile device is in communication range of a third player device is received (step 402). The notification is received, for example, as described above in reference to FIG. 1. The third player device can be the same as one of the first or second player devices, or can be a separate device.

Capabilities for the third player device are received (step 404). The capabilities can indicate one or more types of media content that can be played by the third player device. The capabilities can be received, for example, from the third player device or from another device. The capabilities can also be received from a database, for example, that associates devices with the capabilities identified in media context information received from the devices.

A modified history is generated (step 406). The modified history only includes media content of a type that can be played by the third player device.

In some implementations, generating a modified history includes filtering the history to remove media content of a type that cannot be played by the third device. In some implementations, generating a modified history includes replacing content of a type that cannot be played by the third player with related content. The related content can have a type that the third player can play. Media content can be considered related when a user would consider one content an acceptable substitute for the other content. Various measures of relatedness are possible. For example, two pieces of content can be related if they are alternative forms of the same content. For example, a radio broadcast and an Internet radio broadcast of the same program can be related. Two pieces of content can also be related if they provide information on the same event. For example, a television broadcast of a football game and a radio broadcast of the same football game could be considered similar. Two pieces of content can also be related as determined from user preference data. User preference data includes information received from users about whether or not two given pieces of media content are related. This data can be compiled and stored, e.g., in a database, and then used to create a measure of similarity between two pieces of content. Two pieces of content whose similarity score is above a given threshold can be deemed similar. The threshold can be determined empirically. Two pieces of content can also be related, for example, when they are about the same topic, involve the same talent (e.g., when they have the same actors or directors), are from the same era, are from the same genre, or when they are from the same series (e.g., when they are two different episodes from the same television series). In some implementations, the history includes a current location in the original media content. The current location can be mapped to a second location corresponding to the replacement media content. The mapping is sometimes necessary, because the appropriate location does not directly correlate across media contents. For example, if the original media content includes commercials and the replacement media content does not include commercials, then the current location in the original media content, e.g., elapsed time in the original media content, is different than the current location in the replacement media content should be, because the current location in the original media content includes time spent playing commercials that do not exist on the second media content. As another example, if the original media content is a video and the replacement media content is a picture slideshow, the elapsed time in the video does not directly indicate which picture is being viewed. Mapping can be done by retrieving mapping information from a database. The mapping information could specify, for example, an offset between the current location in the first and second media contents, or a formula for converting between the two locations. For example, in the video to picture slideshow example, if the pictures are shown in the video with regular frequency, the formula could be the current location in the video (e.g., elapsed time) divided by the amount of time spent showing each picture. Mapping can also be performed by matching the data identified in an indirect measure of location in the original media content to a specific location in the replacement media content.

In some implementations, a mobile device stores the history and transfers the history to a server that generates the modified history.

The history is presented (step 408). Presenting the history can include displaying output on a display device, transmitting sounds, providing tactile feedback, or instructing another device (e.g., the mobile device or the third device) to present the history. Presenting the history can include presenting all or a part of the history. The part of the history that is presented can be determined, for example, based on user preferences.

FIG. 5 is an example visual presentation of a history. Information is provided for three pieces of media content, Bob's Photos 502, All Things Considered 504, and The Simpsons 506. The description 508, position 510 (e.g., current location), type 512, and source information 514 for each piece of content is displayed. The description is a description of the content and can be, for example, words, symbols, or an identifier of the content. The description can be determined from the history, or can be retrieved, for example, by looking the description up in a database associating media content identifiers with descriptions. The position is the current location in the media. In the case of a photo slideshow, such as Bob's Photos 502, the position can be a current picture. In the case of an audio broadcast such as All Things Considered 504, the position can be an elapsed time. The type 512 provides information about the type of content, e.g., a description of the aspects of the content (audio, video, etc.). The source information 514 provides information on the source of the content. For example, Bob's Photos 502 comes from the Internet at http://bobsphotos.com, while All Things Considered comes from the radio at 90.1 FM.

An input selecting media content from the history is received (step 410). The input can be received from a user or from another device (e.g., from the mobile device when the mobile device presented the history, and from the third device when the third device presented the history).

The third device is instructed to play the selected media content (step 412). The manager can directly instruct the third player device to begin playing media content, or can send instructions through another device. For example, the manager can send the instruction to the mobile device, and the mobile device can send the instruction to the third player. In some implementations, the media context information for the selected media content includes a current location, and the instruction instructs the third player device to play the selected content beginning from the current location. The location can be a direct measure of location (e.g., an elapsed time), an indirect measure of location, such as a part of the media content data or an identifier generated from the part of the media content data, or a direct measure of location calculated from an indirect measure of location. A direct measure of location can be calculated from an indirect measure of location, for example, by matching the data identified in the indirect measure of location to a specific location in the media content. In some implementations, the indirect location may include multiple data samples. The multiple data samples can be used, for example, to identify a specific location when the first sample matches multiple points in the media content.

In some implementations, the third device is instructed to play related content in place of the selected media content. The third device can be instructed to play related content in place of the selected media content, for example, when the selected media content has a type that cannot be played by the third player device, is from a source from which the third player device cannot receive content, or is no longer available (e.g., when the media content has been deleted or is no longer being transmitted). The related media content can be determined, for example, as described above.

In some implementations, the mobile device is configured to play media content. In these implementations, the manager can present the history and receive input selecting media content as described above in reference to steps 408 and 410, and then instruct the mobile device to play the content, much as described above in reference to step 412.

In some implementations, the history is used to generate content recommendations for a user based on previous content played for the user.

Figure 6:
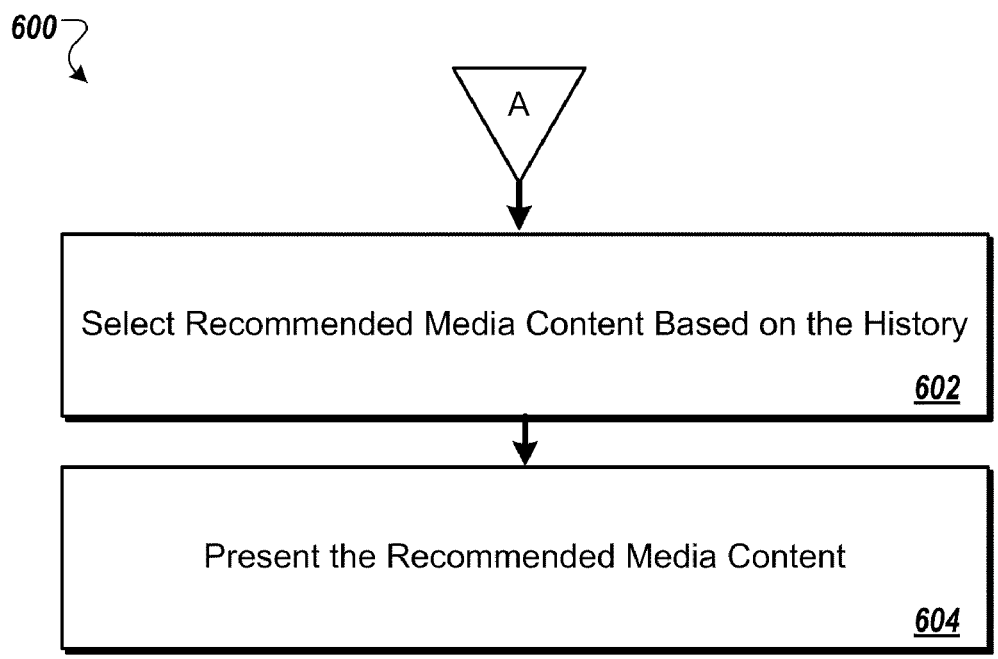
FIG. 6 illustrates an example method for selecting media content and then instructing a player to play the selected media content.

FIG. 6 illustrates an example method for selecting media content and then instructing a player to play the selected media content. The method can be performed by a manager, such as a manager device.

Recommended media content is selected based on the history of the media content (602). In some implementations, the recommended media content is selected by looking up one or more pieces of media content identified in the history in a database associating played content with recommended content, and selecting the recommended content.

In some implementations, the recommended media content is selected based on a profile that is generated from the history for the mobile device. Generally speaking, the profile is a representation of the content associated with the mobile device. The profile includes one or more elements, for example, characteristics of the media that was played, demographic information for the user associated with the mobile device, or interests of the user associated with the mobile device. In some implementations, the profile is specific to the mobile device's geographic location. For example, if content corresponding to one profile is played when the user is at work, and content corresponding to another profile is played when the user is at home, the appropriate profile to generate can be determined based on the current geographic location of the mobile device. As another example, a profile can be tuned to a user's current location, for example, by including characteristics associated with the location (for example, if the user is on Alcatraz Island in San Francisco, Calif., the profile could include characteristics related to prisons, San Francisco, or Alcatraz itself). The current geographic location can be determined, for example, using Global Positioning System (GPS) data, triangulation data, or from the other devices in communication range of the mobile device. In some implementations, a user can modify the profile, for example, by removing media content from the history or adding or removing characteristics from the profile.

Characteristics of the media can include for example, genre, talent, source, language, topic, release date, duration, locations featured in the content, and plot synopses for one or more of the media content included in the history. Characteristics can be retrieved from the history or can be retrieved from another source, for example, by looking up media content from the history in a database of characteristics. Characteristics can also be retrieved by analyzing the media content itself, for example, by converting audio in the content to corresponding text, and analyzing the text for key words or phrases. In some implementations, characteristics for all content in the history are included in the profile. In some implementations, only the most frequent characteristics are included. For example, if television broadcasts of monster truck rallies occur in the history twenty times and a television broadcast of a soccer match occurs in the history one time, the profile might include a monster truck rally characteristic but not include a soccer match characteristic. The most frequent characteristics can be determined, for example, by selecting a threshold number of characteristics with the highest frequencies or by selecting all characteristics whose frequency exceeds a threshold frequency value. Both thresholds can be determined, for example, empirically. In some implementations, the characteristics are weighted, for example, to reflect how frequently content with each characteristic appears in the history.

Demographic information for the user can be generated based on pre-defined rules that associate certain characteristics of content with certain demographic profiles. The demographic profile can be further refined using demographic information provided by the user (for example, age, sex, marital status, etc.) The demographic information does not have to accurately describe the actual user, but may only be a description of the types of content played for the user. The rules can be stored, for example, in a database that associates characteristics with demographic profiles. For example, a rule could associate certain topics of content, such as football games, with men. Another rule could associate certain types of music, for example, rap, with people under 30. If the history included football content and rap content, a profile could be generated that identified the user associated with the mobile device as a man under 30. In some implementations, the demographic information is weighted, for example, based on how similar the identified characteristics are to the characteristics of the demographic profile. Similarity between two sets of characteristics can be determined, for example, by generating a vector for each set of characteristics and calculating the cosine distance between the two vectors. Other standard techniques for determining similarity can also be used.

User interests can be identified from the media content identified in the history when multiple pieces of media content have characteristics that are associated with the same interest. Interest can be determined from information such as language, topic, and source. For example, if a history included French music, television shows on traveling in France, and a video from a French news website, the manager could determine that the user is interested in France. In some implementations, user interests are weighted, for example, based on how close of a match the interest is to the characteristics.

In some implementations, the profile further reflects the amount of each media content that was played. The amount can be an absolute measure of amount (e.g., an elapsed time), or a relative measure of amount (e.g., the percentage of the content that was played). The amount can be used, for example, to adjust the weights described above so that characteristics, demographic information, or user interests based on content that was played for longer are given more weight than characteristics, demographic information, or user interests based on content that was not played for as long. The amount can also be used, for example, to discount or ignore content in the history that was not played for at least a certain threshold amount. The threshold can be determined empirically. In some implementations, the profile further reflects when media content was played. For example, characteristics corresponding to recently played content can be given more weight.

Once the profile is generated, the profile can be stored, for example, in a database that associates a given mobile device with a profile. An identifier for the mobile device, as described above in reference to FIG. 1, can be used to identify the mobile device in the database.

Recommended media content can be selected based on a correspondence to the profile. Recommended media content is selected to appeal to someone with the profile associated with the mobile device. The content can be selected by retrieving content information from a database based on one or more rules that associate certain profile characteristics with certain types of media. The rules can be pre-defined, for example, to associate a certain profile characteristic, demographic profile, or interest with a particular piece of content. The rules can also be dynamic, for example, based on a determination that given content was played in-range of a mobile device with a given profile, and therefore the content should be recommended for mobile devices with a similar profile. Similarity of profiles can be determined, for example, by comparing the elements and element weights of the two profiles, for example, using the cosine distance between two vectors each representing one of the profiles. Other techniques for computing similarity can also be used. In some implementations, the recommended media content is selected by retrieving content information from a database of media content where the content has been associated with one or more characteristics, demographic profiles, or interests. The elements associated with each content item can be compared to the elements of the profile, and the most similar content item can be selected. In some implementations, the recommended media content is content that does not appear in the history associated with the mobile device.

In some implementations, the user provides feedback on the recommendations. This feedback can be used to update the rules used to identify content or the similarity techniques used to identify similar profiles.

In some implementations, capability or source information about the third player device is received. This information can be used to select the recommended media content, for example, by selecting content with a type that can be played by the third device. For example, the media content that is the most similar to the profile among the types of media content that can be played by the third player device, can be selected.

In some implementations, the recommended media content is selected based on a current geographic location of the mobile device. For example, the recommended media content can be selected by selecting an appropriate profile based on the geographic location of the mobile device and using the appropriate profile to select the media content. In some implementations, a mobile device stores the history and transfers the history to a server that selects the recommended media content.

The recommended media content is presented (604). In some implementations, presenting the recommended media content includes displaying output on a display device, transmitting sounds, providing tactile feedback, or instructing another device (e.g., the mobile device or the third device) to present the recommended media content. The manager can directly instruct another device to begin playing media content, or can send instructions through another device.

In some implementations, presenting the media content includes presenting a media content recommendation identifying the recommended media content. The media content recommendation can also include additional information about the content, such as the content's genre, era, talent (e.g., actors, directors, performers, etc.), or which part of the profile the recommendation corresponds to. The media content recommendation can be presented, for example, by displaying output on a display device, transmitting sounds, or providing tactile feedback. The media content recommendation can also be presented by instructing the third device or the mobile device to present the recommendation.

In some implementations, the history is used to identify an advertisement relevant to a user based on previous content played for the user. In some implementations, the user views (or otherwise experiences) the identified advertisement in exchange for services provided to the user (for example, access to content, or phone minutes). In alternative implementations, advertisements are presented to users without exchange of services.

Figure 7:
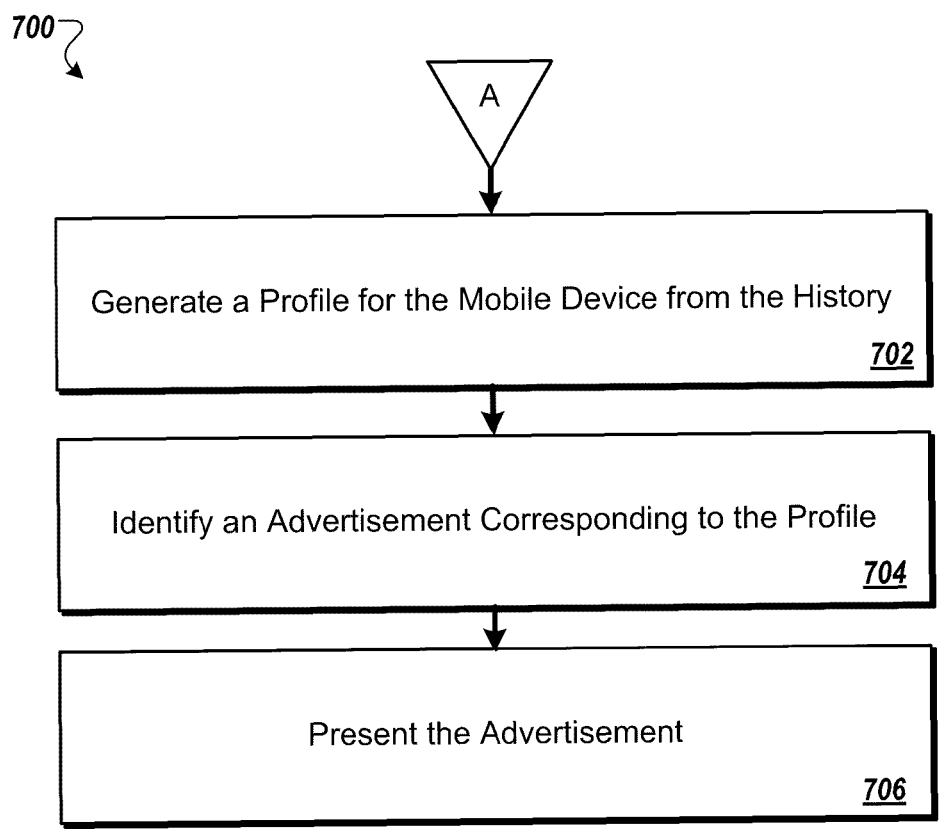
FIG. 7 illustrates an example method for identifying an advertisement corresponding to a user profile and instructing a player to present the advertisement.

FIG. 7 illustrates an example method for identifying an advertisement corresponding to a user profile and instructing a player to present the advertisement. The method can be performed by a manager, such as a manager device.

A profile is generated for the mobile device from the history (step 702), for example, as described above in reference to FIG. 6. In some implementations, the profile is specifically targeted to advertising. For example, the profile can include aspects reflecting the user's response to various types of advertisements.

An advertisement corresponding to the profile is identified (step 704). The advertisement can be identified based on one or more rules that indicate what advertisements should be associated with certain profiles or certain profile elements. For example, an advertisement can be identified from an advertisement database based on the rules. The rules can be pre-defined, for example, to associate a certain profile characteristic, demographic profile, or interest with a particular advertisement. The rules can also be dynamic, for example, based on a determination that a given advertisement achieved a desired effect when it was presented for a mobile device with a similar profile. A desired effect can include, for example, a user purchasing an advertised product in response to the advertisement or following a link provided in an advertisement. Desired effects can be monitored, for example, based on data received from advertisers or users. In some implementations, the advertisements in the database are tagged with relevant characteristics, demographic information, or interests. The identified elements can be compared with the elements of the profile, and an advertisement can be identified based on the similarity between the two sets of elements. Additional information can be used to identify the advertisement, for example, how much each advertiser has paid, how frequently a given advertisement has previously been identified, or how often users have responded positively to the advertisement (e.g., by purchasing goods identified by the advertisement, or following instructions provided in the advertisement). For example, advertisements that were highly paid for can be identified more often, advertisements that have been frequently identified in the past can be identified less frequently, and advertisements to which users frequently respond positively can be identified more often.

In some implementations, the advertisement is selected based on a current geographic location of the mobile device. For example, the advertisement can be selected by selecting an appropriate profile based on the geographic location of the mobile device and using the appropriate profile to identify the advertisement.

In some implementations, a mobile device stores the history and transfers the history to a server that selects the advertisement.

The advertisement is presented (step 706). In some implementations, presenting the advertisement includes displaying output on a display device, transmitting sounds, or providing tactile feedback.

In some implementations, a third notification indicating that the mobile device is in communication range of a third player device is received as described above in reference to FIG. 4, and presenting the advertisement includes instructing the third player device to present the advertisement. In some implementations, presenting the advertisement includes instructing the mobile device to present the advertisement.

The manager can directly instruct the third player device or the mobile device to present the advertisement, or can send instructions through another device. The manager can also send the advertisement to the mobile device as a text message (for example, a short message service (SMS) message), or as a telephone call.

In some implementations, capabilities for the third player device or the mobile device (whichever is instructed to present the advertisement) are received. This information can be used to identify the advertisement, for example, by identifying an advertisement with a type that can be played by the device.

Alternative implementations are also envisioned. For example, the manager can generate a profile and identify an advertisement corresponding to the profile as described above in reference to steps 702 and 704, and then store the advertisement for later presentation.

Figure 8:
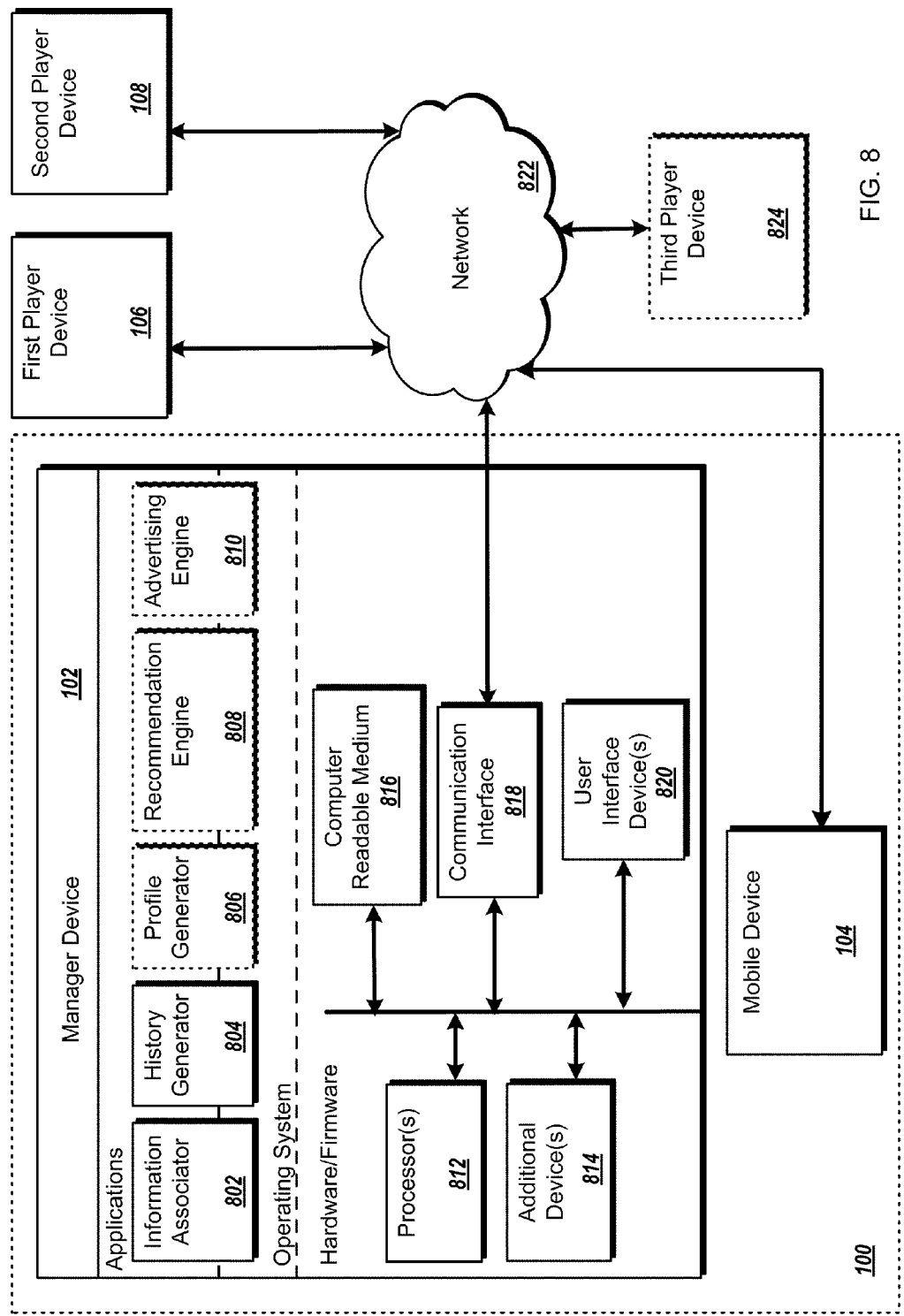
FIG. 8 illustrates an example architecture of a system including a manager device and a mobile device.

FIG. 8 illustrates an example architecture of a system 100 including a manager device 102 and a mobile device 104. One or more of the manager device 102, mobile device 104, first player device 106, second player device 108, and optional third player device 824 are connected through a network 822 or a series of direct connections between devices.

The manager device 102 is a data processing apparatus. While only one data processing apparatus is shown in FIG. 8, a plurality of data processing apparatus may be used.

The manager device 102 includes various modules, e.g., processes or executable software programs. These modules include an information associator 802, history generator 804, optional profile generator 806, optional recommendation engine 808, and optional advertising engine 810. The modules of the manager device may be on one or more of the mobile device 104, the first player device 106, or the second player device 108, or may be separate from those devices. For example, the mobile device can collect media context information using a history generator module 804 included on the mobile device 104, and send this information to modules to the manager device.

The information associator module 802 creates an association between received media context information and a mobile device, for example, as described above in reference to FIG. 3. The information associator module 802 can also generate an identifier for the mobile device, for example, based on information about the device.

The history generator module 804 generates a history of media content played in communication range of the mobile device, for example, as described above in reference to FIG. 3.

The optional profile generator module 806 generates a profile for the mobile device based on the history, for example, as described above in reference to FIGS. 6 and 7.

The optional recommendation engine 808 selects recommended media content based on the profile for the mobile device, for example, as described above in reference to FIG. 6.

The recommendation engine may also generate a media content recommendation including the selected media content and additional information. The recommendation engine may also cause the content or the recommendation to be presented.

The advertising engine 810 identifies an advertisement based on the profile for the mobile device and may also cause the advertisement to be presented, for example, as described above in reference to FIG. 7.

In some implementations, the manager device 102 stores one or more of media context information, associations between media context information and mobile devices, media content, profiles, one or more databases associating media content with profile elements, selected recommended media content, media content recommendations, or identified advertisements. In some implementations, this data is stored on a computer readable medium 816. In some implementations, this data is stored on one or more additional devices 814, for example, a hard drive.

The manager device 102 can also have hardware or firmware devices, for example, one or more processors 812, one or more additional devices 814, computer readable medium 816, and one or more user interface devices 820. User interface devices 820 include, for example, a display, a camera, a speaker, a microphone, or a tactile feedback device.

The manager device 102 uses its communication interface 818 to communicate with one or more of the mobile device 104, the first player device 106, the second player device 108 and the third player device 824 through a network 822. For example, the manager device 102 can receive notifications through its communication interface, receive media context information through its communication interface, and send play instructions and presentation instructions to player devices and the mobile device through its communications interface. The manager device 102 can also receive capabilities through its communications interface.

The mobile device 104 is a data processing apparatus. The mobile device 104 is configured to communicate with one or more of the manager device 102, the first player device 106, the second player device 108, and the third player device 824. The mobile device 104 may also be configured to communicate with other devices not pictured. In some implementations, the mobile device is configured to copy or stream content to or from another device. In some implementations, the mobile device is configured to play media content.

The first player device, second player device, and third player device 106, 108, and 824 are data processing apparatus. While only one data processing apparatus is shown for the each player device, multiple data processing apparatus can be used. The player devices are each configured to play media content. The player devices may be configured to communicate with one or more of the manager device 102, the mobile device 104, or each other. In some implementations, the player devices are also configured to copy and stream media content to and from each other, the manager device, or the mobile device.

Figure 9:
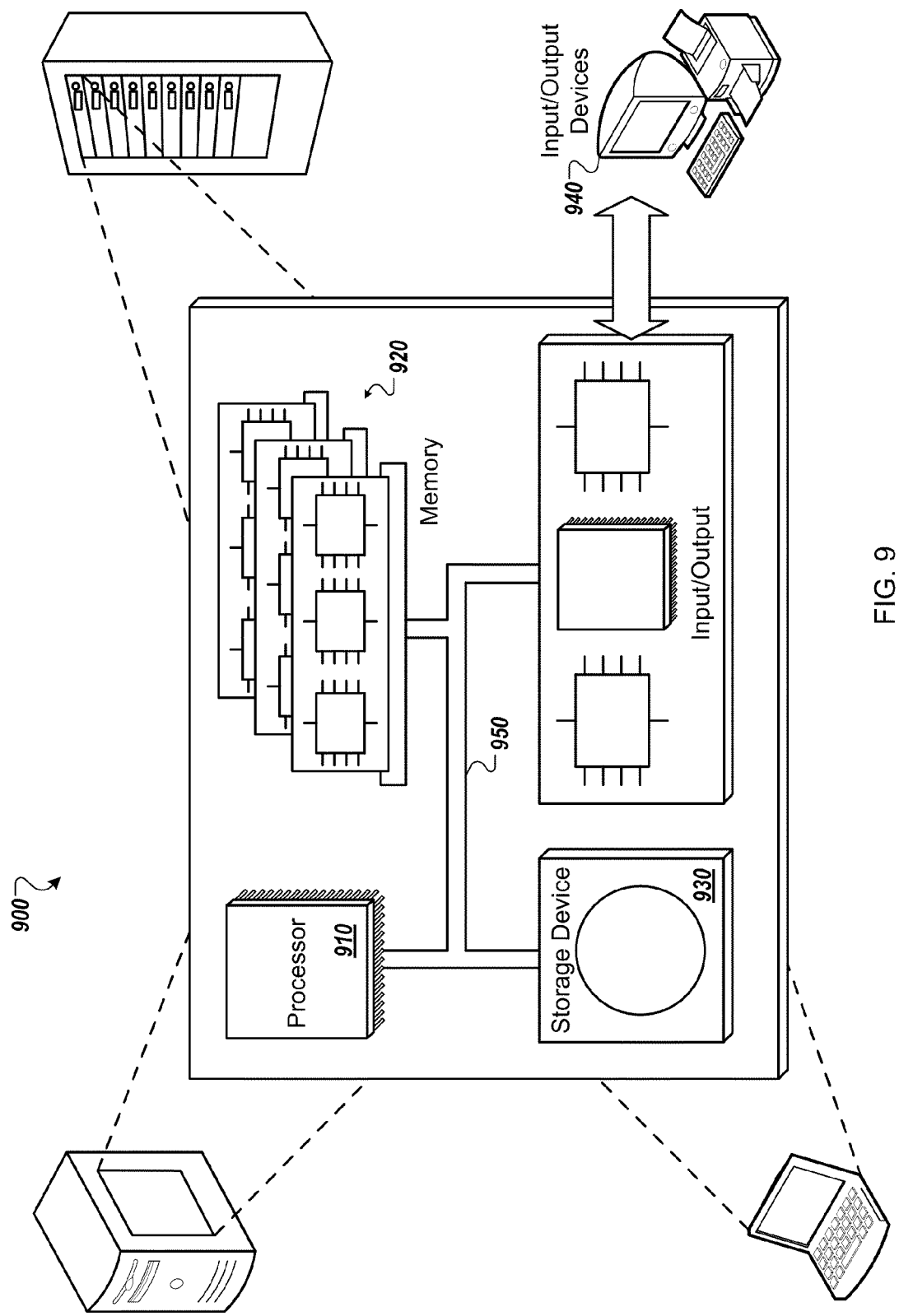
FIG. 9 is a schematic diagram of an example of a generic computer system.

FIG. 9 is a schematic diagram of an example of a generic computer system 900. In some implementations, the system 900 can be used for the operations described in association with one or more of the methods 300, 400, 600, and 700. For example, the system 900 may be included in either or all of the mobile device, manager device, first player, and second player.

The system 900 includes a processor 910, a memory 920, a storage device 930, and an input/output device 940. Each of the components 910, 920, 930, and 940 are interconnected using a system bus 950. Instructions that implement operations associated with the methods described above can be stored in the memory 920 or on the storage device 930. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900, including program instructions. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The storage device can store extractors, pattern matching engines, gadgets, machines, and programs.

The input/output device 940 provides input/output operations for the system 900. In one implementation, the input/output device 940 includes a keyboard and/or pointing device. In another implementation, the input/output device 940 includes a display unit for displaying graphical user interfaces.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
receiving a first notification indicating that a mobile device is in communication range of a first player device;
receiving first media context information from the first player device that specifies first media content currently being played by the first player device and identifies first capabilities for the first player device, where the first capabilities indicate one or more types of media content that can be played by the first player device;
in response to receiving the first media context information, associating the first media context information with the first player device;
receiving a second notification indicating that the mobile device is in communication range of a second player device, where the second player device is distinct from the first player device;
receiving second media context information from the second player device that specifies second media content currently being played by the second player device and identifies second capabilities for the second player device, where the second capabilities indicate one or more types of media content that can be played by the second player device;
in response to receiving the second media context information, associating the second media context information with the second player device; and
generating a history of media content from the first media context information and the second media context information.

2. The method of claim 1 wherein receiving media context information from the first player device includes:
selecting a protocol from a plurality of protocols through which the first player device can communicate; and
receiving media context information according to the selected protocol.

3. The method of claim 1 wherein the first media context information comprises a plurality of packets received from the first player device.

4. The method of claim 1 wherein the first media content is from a first source and the second media content is from a distinct second source.

5. The method of claim 1, further comprising:
receiving a third notification indicating that the mobile device is in communication range of a third player device;
receiving third capabilities for the third player device, where the third capabilities indicate one or more types of media content that can be played by the third player device;
generating a modified history that only includes media content of a type that can be played by the third player device; and
presenting the modified history.

6. The method of claim 5, wherein presenting the modified history includes instructing one of the third player device or the mobile device to present the history.

7. The method of claim 5, further comprising:
receiving input selecting media content from the modified history;
instructing the third device to play the selected media content.

8. The method of claim 7, wherein the selected media content has a timeline, the media context information for the selected media content further includes a current location in the timeline, and instructing the third device to play the selected media content includes instructing the third device to play the selected media content beginning at the current location in the timeline.

9. The method of claim 1, further comprising:
selecting recommended media content based on the history of media content; and
presenting the recommended media content.

10. The method of claim 9 wherein the selecting is further based on a current geographic location of the mobile device.

11. The method of claim 1, further comprising:
selecting an advertisement based on the history of media content; and
presenting the advertisement.

12. A computer program product encoded on a computer storage medium, operable to cause data processing apparatus to perform operations comprising:
receiving a first notification indicating that a mobile device is in communication range of a first player device;
receiving first media context information from the first player device that specifies first media content currently being played by the first player device and identifies first capabilities for the first player device, where the first capabilities indicate one or more types of media content that can be played by the first player device;
in response to receiving the first media context information, associating the first media context information with the first player device;
receiving a second notification indicating that the mobile device is in communication range of a second player device, where the second player device is distinct from the first player device;
receiving second media context information from the second player device that specifies second media content currently being played by the second player device and identifies second capabilities for the second player device, where the second capabilities indicate one or more types of media content that can be played by the second player device;
in response to receiving the second media context information, associating the second media context information with the second player device; and
generating a history of media content from the first media context information and the second media context information.

13. The computer program product of claim 12, further operable to cause the data processing apparatus to perform operations comprising:
receiving a third notification indicating that the mobile device is in communication range of a third player device;
receiving third capabilities for the third player device, where the third capabilities indicate one or more types of media content that can be played by the third player device;
generating a modified history that only includes media content of a type that can be played by the third player device; and
presenting the modified history.

14. The computer program product of claim 13, further operable to cause the data processing apparatus to perform operations comprising:
receiving input selecting media content from the modified history;
instructing the third device to play the selected media content.

15. The computer program product of claim 14, wherein the selected media content has a timeline, the media context information for the selected media content further includes a current location in the timeline, and instructing the third device to play the selected media content includes instructing the third device to play the selected media content beginning at the current location in the timeline.

16. The computer program product of claim 12, further operable to cause the data processing apparatus to perform operations comprising:
   selecting recommended media content based on the history of media content; and
   presenting the recommended media content.

17. The computer program product of claim 12, further operable to cause the data processing apparatus to perform operations comprising:
   selecting an advertisement based on the history of media content; and
   presenting the advertisement.

18. A system comprising: one or more computers operable to perform operations comprising:
   receiving a first notification indicating that a mobile device is in communication range of a first player device;
   receiving first media context information from the first player device that specifies first media content currently being played by the first player device and identifies first capabilities for the first player device, where the first capabilities indicate one or more types of media content that can be played by the first player device;
   in response to receiving the first media context information, associating the first media context information with the first player device;
   receiving a second notification indicating that the mobile device is in communication range of a second player device, where the second player device is distinct from the first player device;
   receiving second media context information from the second player device that specifies second media content currently being played by the second player device and identifies second capabilities for the second player device, where the second capabilities indicate one or more types of media content that can be played by the second player device;
   in response to receiving the second media context information, associating the second media context information with the second player device; and
   generating a history of media content from the first media context information and the second media context information.

19. The system of claim 18 wherein receiving media context information from the first player device includes:
   selecting a protocol from a plurality of protocols through which the first player device can communicate; and
   receiving media context information according to the selected protocol.

20. The system of claim 18 wherein the first media context information comprises a plurality of packets received from the first player device.

21. The system of claim 18, further operable to perform operations comprising:
   receiving a third notification indicating that the mobile device is in communication range of a third player device;
   receiving third capabilities for the third player device, where the third capabilities indicate one or more types of media content that can be played by the third player device;
   generating a modified history that only includes media content of a type that can be played by the third player device; and
   presenting the modified history.

22. The system of claim 21, further operable to perform operations comprising:
   receiving input selecting media content from the modified history;
   instructing the third device to play the selected media content.

23. The system of claim 18, further operable to perform operations comprising:
   selecting recommended media content based on the history of media content; and
   presenting the recommended media content.

24. The system of claim 18, further operable to perform operations comprising:
   selecting an advertisement based on the history of media content; and
   presenting the advertisement.

25. The system of claim 18, wherein the one or more computers comprise a mobile device operable to perform the receiving a first notification, the receiving first media context information, the associating the first media context information with the first player device, the receiving a second notification, the receiving second media context information, the associating the second media context information with the second player device, and the generating a history of media content.

* * * * *